(No Model.)

I. L. UMSTEAD.
DEVICE FOR COOLING TIRES.

No. 257,536. Patented May 9, 1882.

Witnesses
Geo. H. Strong
Frank A. Burks

Inventor
Isaac L. Umstead
By Dewey & Co.
Attys

UNITED STATES PATENT OFFICE.

ISAAC L. UMSTEAD, OF IONE, CALIFORNIA.

DEVICE FOR COOLING TIRES.

SPECIFICATION forming part of Letters Patent No. 257,536, dated May 9, 1882.

Application filed September 24, 1881. (No model.)

*To all whom it may concern:*

Be it known that I, ISAAC L. UMSTEAD, of Ione, county of Amador, and State of California, have invented a Device for Cooling Tires; and I hereby declare the following to be a full, clear, and exact description thereof.

My invention relates to a new and useful device for cooling tires when placed in a highly-heated condition upon the felly of the wheel; and it consists in a revolving platform or table upon which the wheel is secured, said platform being so journaled or hinged that by the operation of a lever it may be turned from a horizontal to a vertical position, in which position its lower half lies within a tank of water, and the whole platform, with its wheel and tire, may be revolved therein, all of which will now more fully appear, reference being made to the accompanying drawings, in which—

Figure 1:
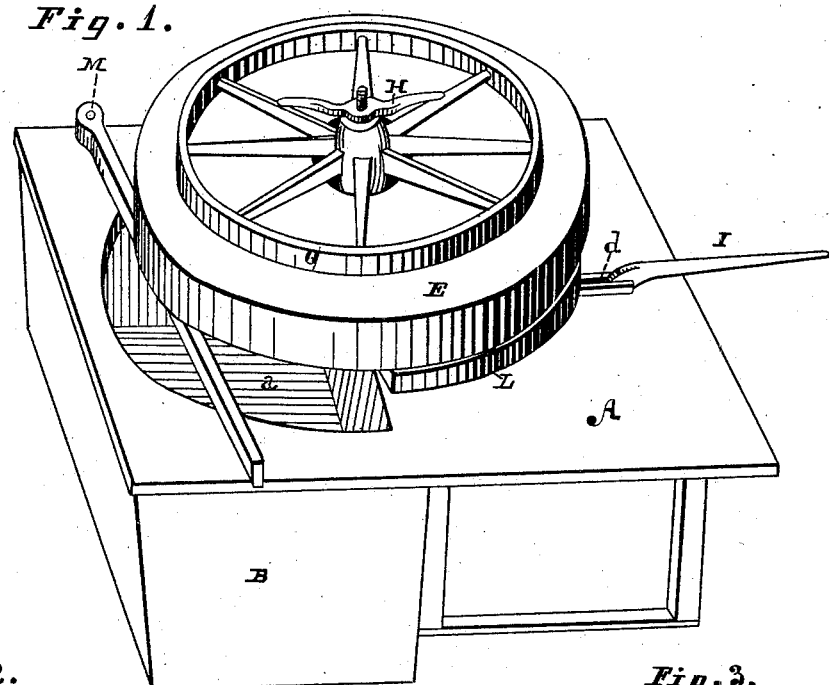
Figure 2:
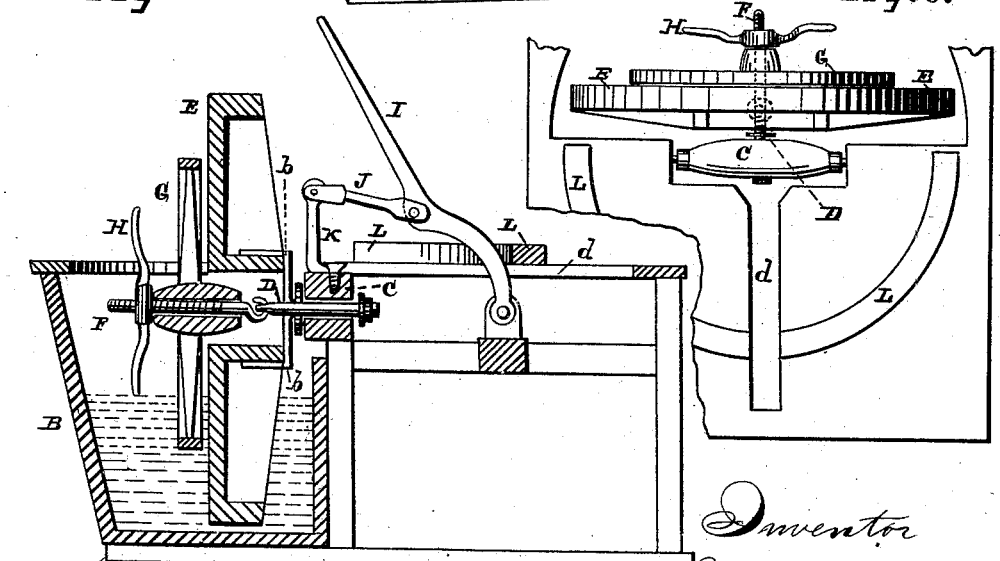
Figure 3:
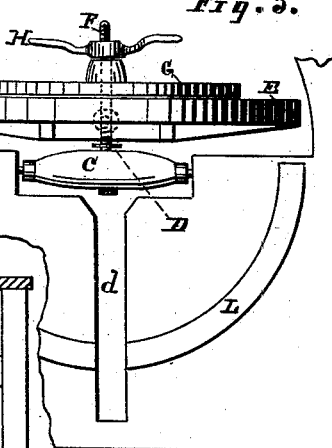
Figure 4:
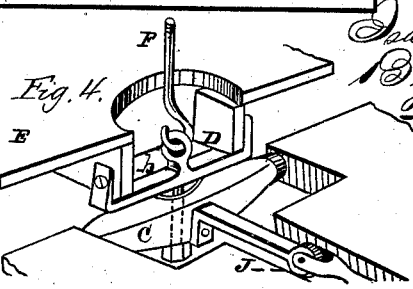

Figure 1 is a perspective view of tank and platform. Fig. 2 is a vertical longitudinal section of same. Fig. 3 is a vertical transverse section of same. Fig. 4 is a detail of construction.

In the ordinary operation of fitting tires to the wheels the wheel is laid upon a platform on the ground or other convenient place in the shop, and the tire, after being heated, is fitted to the felly. In order to keep it from charring or burning the wood, water is poured upon it from buckets or by other similar means, so that it may be cooled. This requires considerable labor, and, while answering in a measure for light work, will not do for heavy tires. When a heavy tire is well heated the application of a few buckets of water will not cool it quickly enough, and it will char the felly.

My invention has for its object the prevention of this result by providing a means for quickly and easily cooling the tire.

Let A represent the floor of a shop, having a hole, *a*, cut therein, under which is constructed a tank, B. In one side of the hole *a*, journaled in the timbers or joints of the floor, is a shaft, C, in which is journaled a spindle, D. This spindle passes through the shaft C, and is secured by a nut upon one end. Its upper end is provided with diverging arms *b*, which are secured to and support the platform or table E, here shown circular in shape. This platform has a central opening, into which the end of the spindle D projects. The spindle D, with its arms *b*, forms an axle for the platform E, so that it may revolve, it being supported free of the floor. To the top of the spindle D is hinged or jointed a rod, F, which extends up through the central aperture of the platform or table E. The wheel G is laid upon the platform E, the rod F passing through the hub. A nut, H, or any clamping device upon top of the rod F, secures the wheel firmly to the platform. The rod F need not of necessity be hinged to the spindle. It could be rigid; but I prefer it as shown, so that it may not be in the way when not in use.

To a brace or cross-piece under the floor is pivoted a lever, I, to the middle of which is pivoted a connecting-rod, J, the other end of which is pivoted to a lever, K, which is attached firmly to the shaft C.

For support for the platform when necessary I have here shown curved flanges L for the rear side, and a swinging brace or bar, M, adapted to stretch across the hole *a* under the platform, for the front side. An extended slot, *d*, in the floor of the shop permits the operation of the lever I. When the platform is horizontal the lever I extends horizontally.

The operation of the device is as follows: The tank under the platform is filled with water, or made to contain as much as is desirable. The wheel is secured firmly to the platform by means of the rod F through its hub. The tire, being heated, is placed upon the felly and the lever I is raised. This turns the shaft C and throws the platform, with the wheel, in a vertical position, its lower half being in the tank of water. It is then revolved vertically, so that the whole tire is passed through the water and is cooled.

The tire may be dipped into the water at any point desired, and if there are places which do not fit up closely, and it is necessary to allow the tire at those points to cool more slowly, the platform may be raised out of the water in its revolution to allow such places to pass without touching the water.

The tire may be fitted up while the wheel is turning in the water or while the platform is lying flat. By the revolution of the wheel any point of the tire may be allowed to cool gradually by raising it up or cooled quickly by lowering it into the water.

Having thus described my invention, what I claim as new, and desire to secure by Letters Patent, is—

The tank $a$ and shaft C, arranged below the floor A, the latter carrying the revolving supporting-wheel E, the lever K, the lever I, and connecting-link J, and the slot $d$, the whole constructed to act in combination in the manner set forth, whereby the wheel and tire and the operating-handle of lever I, when in a horizontal position, may rest immediately upon the floor, for the purpose described.

In witness whereof I have hereunto set my hand.

ISAAC L. UMSTEAD.

Witnesses:
A. L. ADAMS,
J. W. SURFACE.